(12) United States Patent
Hardacker et al.

(10) Patent No.: US 8,068,178 B2
(45) Date of Patent: Nov. 29, 2011

(54) BEZEL COLOR COORDINATION

(75) Inventors: Robert Hardacker, Escondido, CA (US); Rafael Calderon, San Diego, CA (US); Steven Richman, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 107 days.

(21) Appl. No.: 12/582,274

(22) Filed: Oct. 20, 2009

(65) Prior Publication Data

US 2010/0289957 A1 Nov. 18, 2010

Related U.S. Application Data

(60) Provisional application No. 61/179,304, filed on May 18, 2009.

(51) Int. Cl.
  H04N 7/00 (2006.01)
  H04N 11/00 (2006.01)
  H04N 5/46 (2006.01)
  H04N 9/30 (2006.01)
  H04N 5/64 (2006.01)

(52) U.S. Cl. ........ 348/552; 348/553; 348/791; 348/836; 348/558

(58) Field of Classification Search .......... 348/552, 348/553, 790, 791, 836
See application file for complete search history.

(56) References Cited

U.S. PATENT DOCUMENTS

| | | | | |
|---|---|---|---|---|
| 5,291,295 A | * | 3/1994 | Srivastava | 348/805 |
| 5,488,434 A | * | 1/1996 | Jung | 348/725 |
| 5,825,347 A | * | 10/1998 | Prinsen | 345/629 |
| 6,578,972 B1 | | 6/2003 | Heirich et al. | |
| 6,611,297 B1 | * | 8/2003 | Akashi et al. | 348/739 |
| 6,778,226 B1 | * | 8/2004 | Eshelman et al. | 348/836 |
| 6,825,858 B2 | * | 11/2004 | Sato | 715/735 |
| 6,847,411 B2 | * | 1/2005 | Pan et al. | 348/839 |
| 7,209,180 B2 | * | 4/2007 | Takagi et al. | 348/558 |
| 7,209,187 B2 | | 4/2007 | Mears et al. | |
| 7,493,177 B2 | | 2/2009 | Ledbetter et al. | |
| 7,573,383 B2 | * | 8/2009 | Yun et al. | 340/540 |
| 7,605,873 B2 | * | 10/2009 | Tseng et al. | 348/729 |
| 7,616,262 B2 | * | 11/2009 | Eves et al. | 348/553 |
| 7,758,423 B2 | * | 7/2010 | Foster et al. | 463/31 |
| 7,847,818 B2 | * | 12/2010 | Asami | 348/111 |
| 7,861,257 B2 | * | 12/2010 | Park et al. | 725/28 |
| 7,880,816 B2 | * | 2/2011 | Kinoshita et al. | 348/705 |
| 7,894,000 B2 | * | 2/2011 | Gutta et al. | 348/603 |

(Continued)

FOREIGN PATENT DOCUMENTS

EP    1168288    1/2002

(Continued)

OTHER PUBLICATIONS

PCT search report in PCT/US2010/034700, the PCT counterpart to the U.S. Appl. No. 12/582,274, which is directed to subject matter related to the present U.S. patent application.

(Continued)

*Primary Examiner* — Brian Yenke
(74) *Attorney, Agent, or Firm* — John L. Rogitz

(57) ABSTRACT

A processor, such as a TV processor, determines which one of at least two audio-video components is sending signals to a TV for display. Based on the determining act, the processor establishes a color of a bezel of the TV.

8 Claims, 1 Drawing Sheet

U.S. PATENT DOCUMENTS

| | | | |
|---|---|---|---|
| 2002/0018050 A1 | 2/2002 | Turner | |
| 2002/0171624 A1* | 11/2002 | Stecyk et al. | 345/156 |
| 2002/0186325 A1 | 12/2002 | Mears et al. | |
| 2004/0156192 A1 | 8/2004 | Kerr et al. | |
| 2006/0007169 A1* | 1/2006 | Robbins et al. | 345/173 |
| 2006/0033720 A1* | 2/2006 | Robbins et al. | 345/173 |
| 2006/0209527 A1 | 9/2006 | shin | |
| 2007/0300188 A1* | 12/2007 | Kim | 715/835 |
| 2009/0106663 A1* | 4/2009 | Pirie et al. | 715/744 |
| 2009/0289874 A1* | 11/2009 | Ha | 345/1.3 |
| 2010/0052548 A1* | 3/2010 | Allard et al. | 315/154 |
| 2010/0053229 A1 | 3/2010 | Krijn et al. | |
| 2010/0289666 A1* | 11/2010 | Hardacker et al. | 340/815.45 |
| 2011/0012746 A1* | 1/2011 | Fish et al. | 340/691.6 |
| 2011/0018462 A1* | 1/2011 | Lowe et al. | 315/294 |
| 2011/0018849 A1* | 1/2011 | Lowe et al. | 345/205 |
| 2011/0051019 A1* | 3/2011 | Hardacker et al. | 348/739 |

FOREIGN PATENT DOCUMENTS

| | | |
|---|---|---|
| JP | 8149387 | 6/1996 |
| JP | 11-289502 | 10/1999 |
| JP | 2007194625 | 8/2007 |
| KR | 20-1999-0009217 | 3/1999 |
| KR | 20010094205 | 10/2001 |
| KR | 10-2002-0085813 | 11/2002 |
| KR | 20050023209 | 3/2005 |
| KR | 10-0833616 | 5/2008 |
| WO | 2008065614 | 6/2008 |

OTHER PUBLICATIONS

PCT search report in PCT/US2010/034687, which is the PCT counterpart to the present U.S. patent application.

Robert Hardacker et al., "Active Bezel Edge Lighting with Diffuser Layer", file history of co-pending U.S. Appl. No. 12/582,188, filed Oct. 20, 2009 (1168.398).

Robert Hardacker, et al. "Feedback System for Optimizing Exposure", file history of co-pending U.S. Appl. No. 12/556,084, filed Sep. 9, 2009 (1168.409).

Robert Hardacker, et al. "Bezel Illumination for Digital Devices", file history of co-pending U.S. Appl. No. 12/582,401, filed Oct. 20, 2009 (1168.411).

\* cited by examiner

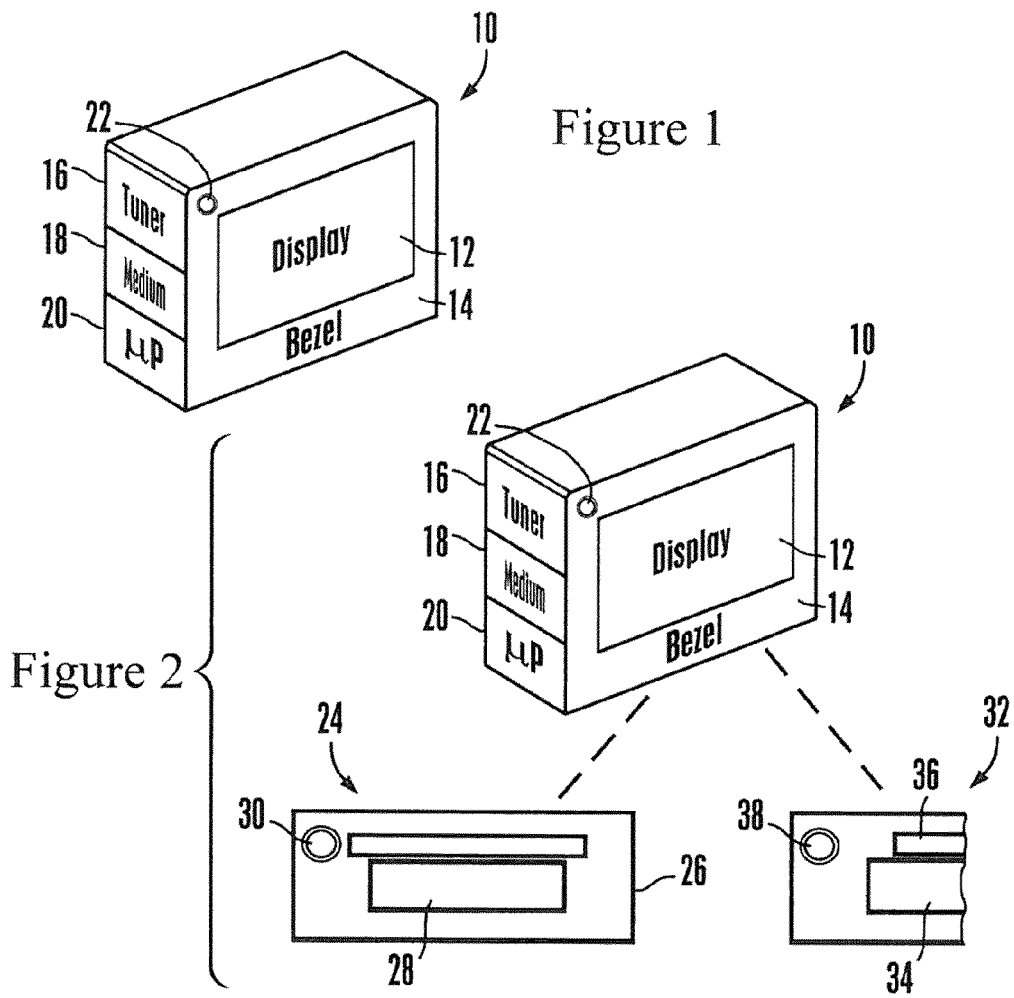
Figure 1
Figure 2
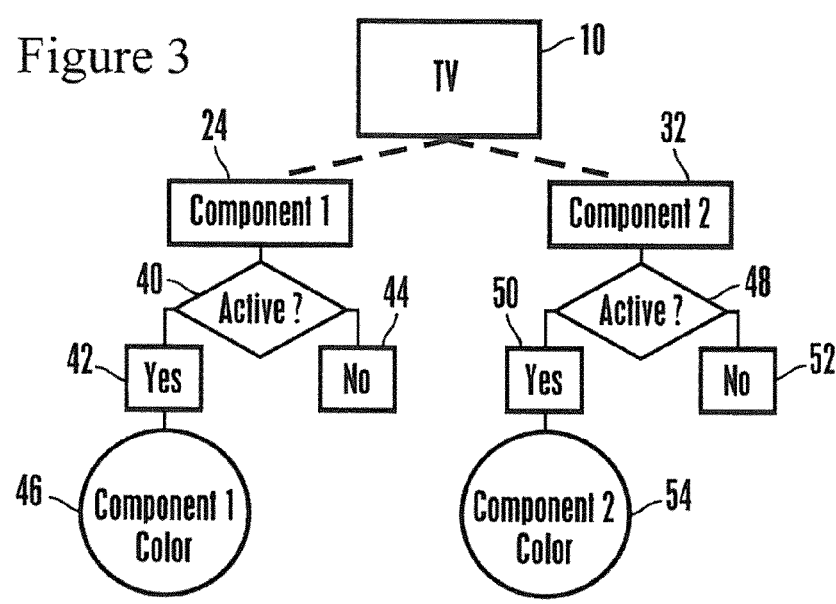
Figure 3

BEZEL COLOR COORDINATION

This application claims priority to U.S. provisional patent app. 61/179,304, filed May 18, 2009.

I. FIELD OF THE INVENTION

Present principles apply to coordinating bezel illumination color in home entertainment systems.

II. BACKGROUND OF THE INVENTION

Home entertainment systems come in a variety of colors, shapes, and sizes. One or more individual electronic pieces may make up the entertainment system. Often individual pieces of equipment work separately, such as a TV by itself, or can synchronize their functions to perform tasks that no single piece could accomplish, i.e. TV displaying a picture from a DVD player and sending its sound to a stereo system.

SUMMARY OF THE INVENTION

As understood herein, synchronization of light sources mounted on each component allows for easily visible designation of the active component.

Home entertainment systems may include a number of components in addition to a TV, such as a DVD player, Blue ray player, VCR player, etc. In order to visually distinguish which component is active, each is designated with a color of light emitted by a light source within the bezel of the component. The light sources may be disposed within any number of corners or as a decorative edge border on the front of the bezel. The TV contains a processor that synchronizes with an audio/video component when active as a light source(s) capable of emitting the colors specific to components. When a first component is active, its light source will emit light of a particular color and the TV's light source will emit light of the same color.

Accordingly, a system includes a TV including a TV display framed by a TV bezel. At least one TV bezel light source is disposed in the TV bezel. Light from the light source passes through the TV bezel to be visible to a person. A first component communicates with the TV and has a first component bezel. At least one first component bezel light source is disposed in the first component bezel, with light from the first component bezel light source passing through the first component bezel to be visible to a person. The first component bezel light source emits light of a first color. Also, a second component communicates with the TV and has a second component bezel. At least one second component bezel light source is disposed in the second component bezel, with light from the second component bezel light source passing through the second component bezel to be visible to a person. The second component bezel light source emits light of a second color different from the first color. A processor causes the TV bezel light source to emit light of the first color when the TV presents information from the first component. In contrast, the processor causes the TV bezel light source to emit light of the second color when the TV presents information from the second component. Without limitation, the first component can be a disk player and the second component can be a home theater or a set-top box (STB) (cable, satellite, SSD server, etc) attached to the TV via a networking method including HDMI, LAN, wireless, etc.

In another aspect, a method includes determining which one of at least two audio-video components is sending signals to a TV for display, and based on the determining act, establishes a color of a bezel of the TV.

In another aspect, a TV has a display, a tuner receiving video signals for presentation on the display, and a processor communicating with the tuner. A bezel frames the display. First light sources characterized by a first color are positioned to illuminate the bezel from the interior of the bezel. And, second light sources characterized by a second color are positioned to illuminate the bezel from the interior of the bezel. The processor energizes the first light sources but not the second light sources to internally illuminate the bezel with the first color in response to the processor determining that it is receiving audio-video data from a first component. In contrast the processor energizes the second light sources but not the first light sources to internally illuminate the bezel with the second color in response to the processor determining that it is receiving audio-video data from a second component.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a perspective view of a display device, showing interior components schematically;

FIG. 2 illustrates the connections that may exist in a home theatre system; and

FIG. 3 is a flow chart of example logic for selecting a bezel illumination color.

DETAILED DESCRIPTION OF THE PREFERRED EMBODIMENT

Referring initially to FIG. 1, a TV, generally designated 10, contains a display screen 12 and is encased by a bezel 14. The display 12 may be of any type and form, i.e. flatscreen LCD. The bezel material may be, but is not limited to, plastic. Internal components of the TV 10 include a tuner 16 used for receiving a signal, a medium 18, and a microprocessor (MP) 20. The processor 20 may be a TV processor and receives and interprets signals from other components of a home theatre system.

A light source 22 is disposed within the bezel 14 of the TV 10 near the edge of the front panel of the bezel 14 in a decorative fashion, where light passes through the bezel 14 and can be seen by a person. The light source 22 may also be disposed in one or more corners of the bezel 14. The light source 22 may use light diffusing techniques and may include multiple triluminous LED's to create a color-customizable illuminated edge around the TV 10. The light source 22 may emitted various forms of light including simple color, color patterns, and dynamic color patterns.

Moving in reference to FIG. 2, the TV 10 is shown in a manner similar to that of FIG. 1, including a display 12, bezel 14, internal components 16, 18, and 20, and a light source 22. An example non-limiting first component 24 of the same home theatre system that comprises the TV 10 incorporates a first component bezel 26, a first component display screen 28, and at least one first component light source 30 disposed within the first component bezel 26. The first component 24 may be, but is not limited to, a disk player. The color of light emitted from the first component light source 30, designated as first light color, passes through the first component bezel 26 and can be seen by a person. In some embodiments, multiple light sources 30 of different colors may be implemented for purposes to be shortly disclosed.

An example non-limiting second component 32 includes a second component bezel 34, second component display screen 36, and a second component light source 38. The color of light emitted from the second component light source 38, designated second light color, passes through the second component bezel 26 and can be seen by a person. The second component 32 may be, but is not limited to, a home theatre or a set-top box (STB) (cable, satellite, SSD server, etc) attached to the TV via a networking method including HDMI, LAN, wireless, etc. In some embodiments, multiple light sources 38 of different colors may be implemented for purposes to be shortly disclosed.

In one implementation, the processor 20 causes the TV bezel light source 22 to emit light of the first color when the TV presents information from the first component 24, the bezel of which also emits the first color of light. Moreover, the processor 20 causes the TV bezel light source 22 to emit light of the second color when the TV presents information from the second component 32, the bezel of which emits light of a second color. Both the component light source 30 and second component light source 38 may be disposed in any number of corners the corresponding bezel 26 or 34, or as a decorative edging similar to that which may comprise the TV light source 22. In any case, in this embodiment and assuming that the component bezels emit light of only a single color, the color of the TV bezel, which may be selected from a menu of colors by a user, is automatically established to match the color of light emitted from the bezel of the "active" component, i.e., the component that is sourcing content to or sinking content from the TV.

In another embodiment, the TV bezel may emit a user-selected color of light, with the TV processor causing the controllers of the other components, which in this case have multiple colors of light sources in their bezels, to match the user-selected color of the TV bezel.

Now referring to FIG. 3, a flow diagram is shown to demonstrate an embodiment of the method accomplished by the processor 20. The TV 10 is linked to and communicates with the first component 24. At state 40 the processor 20 determines whether the first component 24 is active. If the information presented to the processor 20 confirms the first component 24 is in fact active at block 42, the light sources 22 and 30 are synchronized at state 46 in that they are caused by the one of the above processors, e.g., the TV processor 20, to emit corresponding, preferably identical, colors, intensities, durations, synchronization, and/or synchronized sub-time. This may be done by simply causing the light sources in the TV bezel to emit only the color of light emitting by the light sources in the bezel of the component 24, or vice-versa, i.e., by causing the light sources in the component bezel to emit only the color of light, preferably user-selected, emitted by the TV bezel. If the processor 20 determines that the first component 24 is not active (state 44), no action is taken to synchronize the light sources 22 and 30.

The processing for the second component 32 is identical. The second component 32 is analyzed for activity at state 48. If the second component 32 is active (state 50), the light sources 22 and 38 are synchronized at state 54 as described above. If the processor 20 determines that the second component 32 is not active (state 52), no action is taken to synchronize the light sources 22 and 38. Neither first component 24 nor second component 32 require a wired link with the TV as any networking (wired or wireless) may be used.

While the particular BEZEL COLOR COORDINATION is herein shown and described in detail, it is to be understood that the subject matter which is encompassed by the present invention is limited only by the claims.

What is claimed is:

1. System comprising:
   a TV including a TV display framed by a TV bezel;
   at least one TV bezel light source disposed in the TV bezel, light from the light source passing through the TV bezel to be visible to a person;
   a first component communicating with the TV and having a first component bezel;
   at least one first component bezel light source disposed in the first component bezel, light from the first component bezel light source passing through the first component bezel to be visible to a person, the first component bezel light source emitting light of a first color;
   a second component communicating with the TV and having a second component bezel;
   at least one second component bezel light source disposed in the second component bezel, light from the second component bezel light source passing through the second component bezel to be visible to a person, the second component bezel light source emitting light of a second color different from the first color; and
   a processor causing the TV bezel light source to emit light of the first color when the TV actively presents information from the first component, the processor causing the TV bezel light source to emit light of the second color when the TV actively presents information from the second component.

2. The system of claim 1, wherein the processor is a TV processor in the TV.

3. The system of claim 1, wherein the first component is a disk player.

4. The system of claim 3, wherein the second component is a home theater.

5. TV comprising:
   display;
   tuner receiving video signals for presentation on the display;
   processor communicating with the tuner;
   bezel framing the display;
   first light sources characterized by a first color positioned to illuminate the bezel from the interior of the bezel; and
   second light sources characterized by a second color positioned to illuminate the bezel from the interior of the bezel;
   wherein the processor energizes the first light sources but not the second light sources to internally illuminate the bezel with the first color in response to the processor determining that it is receiving audio-video data from a first component, and further wherein the processor energizes the second light sources but not the first light sources to internally illuminate the bezel with the second color in response to the processor determining that it is receiving audio-video data from a second component.

6. The TV of claim 5, comprising LEDs establishing the light sources.

7. The system of claim 5, wherein the first component is a disk player.

8. The system of claim 7, wherein the second component is a home theater.

* * * * *